US010860744B2

(12) United States Patent
Norem

(10) Patent No.: US 10,860,744 B2
(45) Date of Patent: Dec. 8, 2020

(54) SYSTEM AND METHOD FOR ENSURING INTEGRITY AND CONFIDENTIALITY OF DATA PROGRAMMED IN AN INSECURE MANUFACTURING ENVIRONMENT

(71) Applicant: Silicon Laboratories Inc., Austin, TX (US)

(72) Inventor: Joshua Jay Norem, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 267 days.

(21) Appl. No.: 16/196,064

(22) Filed: Nov. 20, 2018

(65) Prior Publication Data

US 2020/0159965 A1 May 21, 2020

(51) Int. Cl.
| | |
|---|---|
| *G06F 21/64* | (2013.01) |
| *H04L 9/32* | (2006.01) |
| *H04L 9/30* | (2006.01) |
| *H04L 9/08* | (2006.01) |
| *G06F 21/60* | (2013.01) |
| *G06F 9/4401* | (2018.01) |

(52) U.S. Cl.
CPC ............ *G06F 21/64* (2013.01); *G06F 9/4401* (2013.01); *G06F 21/602* (2013.01); *H04L 9/085* (2013.01); *H04L 9/30* (2013.01); *H04L 9/3268* (2013.01)

(58) Field of Classification Search
CPC ...... G06F 21/64; G06F 21/602; G06F 21/572; G06F 9/4401; H04L 9/3268; H04L 9/085; H04L 9/30; H04L 9/3234; H04L 9/0825; H04L 9/0877
See application file for complete search history.

(56) References Cited

U.S. PATENT DOCUMENTS

| | | | |
|---|---|---|---|
| 2010/0008510 A1* | 1/2010 | Zayas | G06F 21/572 380/283 |
| 2017/0372076 A1* | 12/2017 | Poornachandran | G06F 21/74 |

* cited by examiner

*Primary Examiner* — Nelson S. Giddins
(74) *Attorney, Agent, or Firm* — Nields, Lemack & Frame, LLC

(57) ABSTRACT

A system and method of downloading firmware into an embedded device while maintaining the integrity and confidentiality of the firmware is disclosed. In one embodiment, the process comprises four phases. In the first phase, unauthenticated content is written into the memory of the embedded device. In the second phase, this content is verified. In the third step, a secure connection is established between the host and the embedded device. In the fourth step, the firmware is loaded into the embedded device using this secure connection. The firmware is encrypted as it is transferred from the host to the embedded device and is never accessible outside of the embedded device.

15 Claims, 6 Drawing Sheets

SYSTEM AND METHOD FOR ENSURING INTEGRITY AND CONFIDENTIALITY OF DATA PROGRAMMED IN AN INSECURE MANUFACTURING ENVIRONMENT

FIELD

This disclosure describes systems and methods for ensuring the integrity and confidentiality of data programmed into a semiconductor device occurring in an insecure manufacturing environment.

BACKGROUND

Many embedded devices, such as system-on-chip (SoC) devices and others, are programmed with firmware before being sent to customers. These embedded devices may be manufactured by a device manufacturer (DM), who then sells them to an original equipment manufacturer (OEM). The OEM incorporates these embedded devices into a product and also creates the firmware to operate these embedded devices. In many instances, this firmware is proprietary and represents valuable intellectual property to the OEM.

Further, in many cases, the OEM lacks the infrastructure to manufacture the complete system. Thus, the OEM often uses a contract manufacturer (CM) to provide the assembly and test services. In other words, a third party is entrusted with the programming of these embedded devices.

Protecting the integrity and confidentiality of the firmware at the contract manufacturer may be problematic. For example, the contract manufacturer may be producing products for a number of OEM customers, making it impossible to physically secure the premises. Additionally, securing the manufacturing environment may be difficult and expensive due to the complexity and nature of the programming environment.

Therefore, it would be advantageous if there were a system and method of protecting the integrity and confidentiality of the firmware within an embedded device without relying on physical security measures.

SUMMARY

A system and method of downloading firmware into an embedded device while maintaining the integrity and confidentiality of the firmware is disclosed. In one embodiment, the process comprises four phases. In the first phase, unauthenticated content is written into the memory of the embedded device. In the second phase, this content is verified. In the third step, a secure connection is established between the host and the embedded device. In the fourth step, the firmware is loaded into the embedded device using this secure connection. The firmware is encrypted as it is transferred from the host to the embedded device and is never accessible outside of the embedded device.

In one embodiment, a method of loading firmware into an embedded device while maintaining the integrity and confidentiality of the firmware is disclosed. The embedded device comprises a memory and a Secure Enclave having a processing unit, wherein a first part of the memory is disposed in the Secure Enclave, a second part of the memory is disposed outside the Secure Enclave. The method comprises downloading unauthenticated content from the secure host into the second part of the memory; using the Secure Enclave to verify the unauthenticated content was loaded by a trusted entity; transmitting a shared key from the secure host to the Secure Enclave, wherein the shared key is encrypted; and loading the firmware from the secure host to the second part of the embedded device, wherein the firmware is encrypted using the shared key. In certain embodiments, the unauthenticated content comprises a bootloader. In some embodiments, when loading the firmware, the secure host communicates directly with the bootloader. In certain embodiments, the unauthenticated content further comprises a first public key certificate and the Secure Enclave uses the first public key certificate to verify the bootloader. In certain embodiments, the secure host loads a second public key certificate with the bootloader, and wherein the bootloader uses the second public key certificate to verify the firmware from the secure host. In some embodiments, the Secure Enclave prevents access to the second part by the secure host after the unauthenticated content has been verified. In certain embodiments, one or more public key certificates are loaded into the memory, and the secure host verifies that an identity of the embedded device based on the one or more public key certificates. In certain embodiments, the shared key is encrypted using a public key contained in the one or more public key certificates.

According to a second embodiment, a method of loading firmware into an embedded device while maintaining the integrity and confidentiality of the firmware is disclosed. The embedded device comprises a memory and a Secure Enclave having a processing unit, wherein a first part of the memory is disposed in the Secure Enclave, a second part of the memory is disposed outside the Secure Enclave. The method comprises downloading a first public key certificate, referred to as MCU_PLATFORM_SIGN_CERTPUB certificate, from the secure host into the memory; downloading a bootloader from the secure host into the second part of the memory, wherein the bootloader is signed using a private key associated with the MCU_PLATFORM_SIGN_CERTPUB certificate; downloading a second public key certificate, referred to as HOST_APP_ID_CERTPUB certificate, from the secure host to the second part of the memory; using the Secure Enclave to verify the bootloader was loaded by a trusted entity using the MCU_PLATFORM_SIGN_CERTPUB certificate; transmitting a shared key from the secure host to the Secure Enclave, wherein the shared key is encrypted using a public key contained within a third public key certificate, referred to as SE_CHIP_ID_CERTPUB certificate, stored in the memory, and signed using a private key associated with the HOST_APP_ID_CERTPUB certificate; and loading the firmware from the secure host to the bootloader, wherein the firmware is encrypted using the shared key. In some embodiments, the Secure Enclave prevents access to the second part by the secure host after the bootloader has been verified. In some embodiments, the secure host loads a fourth public certificate, referred to as MCU_PLATFORM_UNLOCK_CERTPUB, wherein the secure host may later unlock the second part using a private key associated with the MCU_PLATFORM_UNLOCK_CERTPUB certificate. In certain embodiments, a public key certificate, referred to as SE_CHIP_ID_CERTPUB certificate, and a public key certificate, referred to as BATCH_#_BATCH_CERTPUB certificate, are loaded into the memory, and the secure host verifies that an identity of the embedded device based on the SE_CHIP_ID_CERTPUB certificate and the BATCH_#_BATCH_CERTPUB certificate. In certain embodiments, the SE_CHIP_ID_CERTPUB certificate is signed using a private key associated with the BATCH_#_BATCH_CERTPUB certificate. In certain embodiments, the BATCH_#_BATCH_CERTPUB certificate is signed using a private key, wherein a public key is available from a manufacturer of the embedded device.

According to a third embodiment, a method of loading firmware into an embedded device while maintaining the integrity and confidentiality of the firmware is disclosed. The embedded device comprises a memory and a Secure Enclave having a processing unit, wherein a first part of the memory is disposed in the Secure Enclave, a second part of the memory is disposed outside the Secure Enclave. The method comprises transmitting a shared key from the secure host to the Secure Enclave, wherein the shared key is encrypted using a public key contained within a first public key certificate, referred to as SE_CHIP_ID_CERTPUB certificate, stored in the memory; transmitting the firmware from the secure host to the Secure Enclave, wherein the firmware is encrypted using the shared key; and using the Secure Enclave to load the firmware into the second part.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
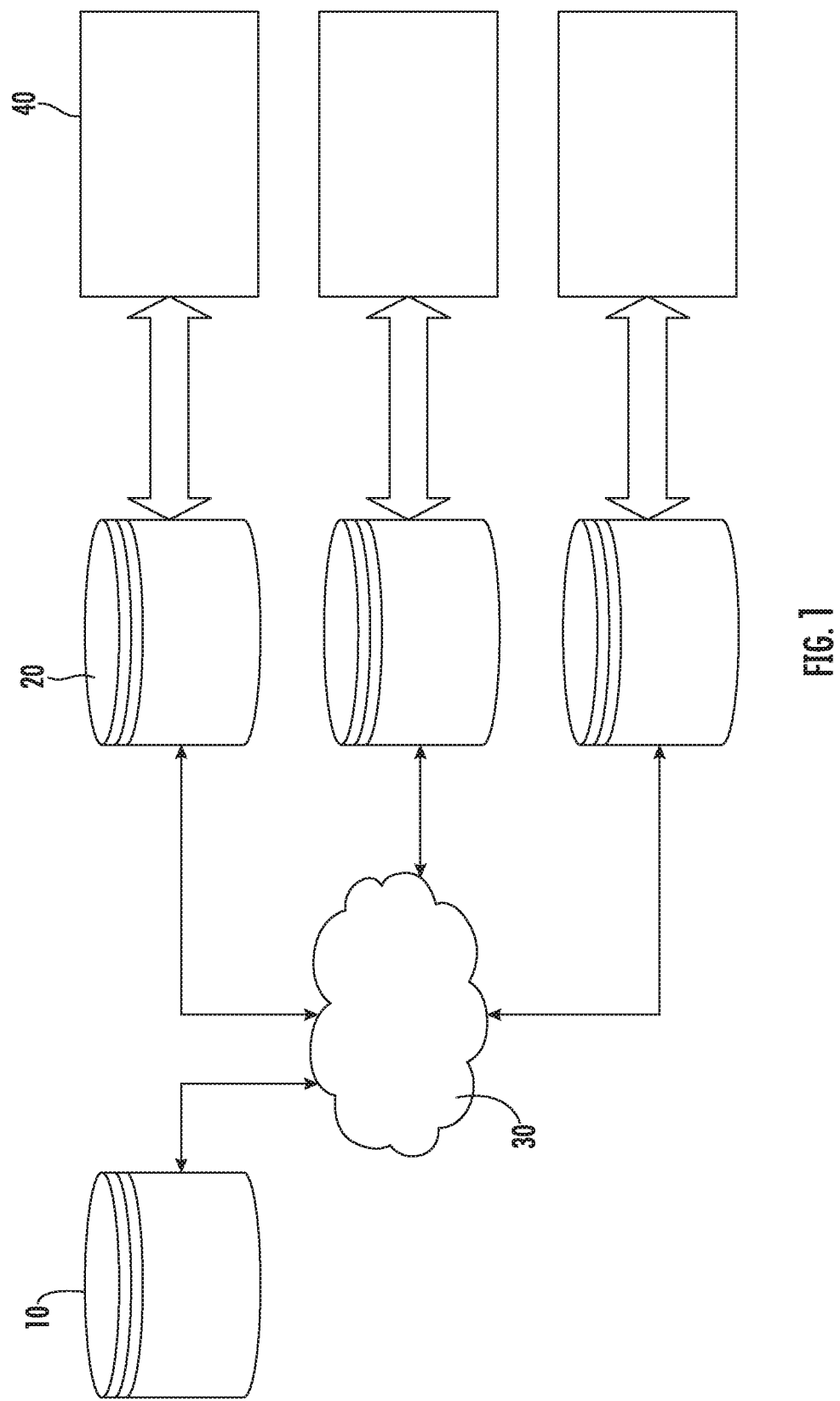
FIG. 1 shows the configuration of a typical manufacturing environment.

FIG. 1 shows a block diagram of a representative manufacturing environment. This includes a secure host 10 that can communicate with a number of test systems 20 via a connection through a network 30. Each test system 20 executes a test program which programs and tests the product 40 being manufactured. The test systems 20 generally include a computing unit, such as a PC, dedicated test hardware and a plurality of physical connections, such as cables, test harnesses and other components.

The method of communication between the test system 20 and the product 40 is not limited by the present disclosure. For example, this communication may occur using a debug port, such as SerialWire, or by communicating to a bootloader already installed on the product 40. For example, the physical communication may occur over a wired interface, such as Universal Serial Bus (USB), universal asynchronous receiver-transmitter (UART), Serial Peripheral Interface (SPI), Inter-integrated circuit (I2C), or others. The test system 20 would be disposed at one end of the wired interface, and the bootloader would be disposed on the other end.

The secure host 10 is a computing unit, such as a PC, server, or other device, that is trusted by the OEM. The location and construction of this secure host 10 may be a tradeoff between the security of the manufacturing process and the cost of that manufacturing process. In certain embodiments, the secure host 10 may be physically located at the contract manufacturer's facility but may have both physical and electronic security that prevents any contract manufacturer personnel from interacting with the secure host 10.

The product 40 may include an embedded device, such as a SoC, that has a number of features. These features include:

Secure Boot: the ability of the embedded device to validate programmed data of the embedded device using public key cryptography and some amount of immutable storage. This immutable storage may be a read only memory (ROM), a one time programmable (OTP), a LockedFlash, or some other device. In certain embodiments, this secure boot comprises code that is executed by a processing unit disposed in the Secure Enclave. In another embodiment, there may be a "virtual" Secure Enclave that exists only during the boot process to perform this function. In either embodiment, the Secure Boot functionality is implemented in a manner so that it cannot be interfered with or bypassed in any way by the OEM.

Secure Key Storage: The ability of the embedded device to store a secret key in a way resistant to side channel attacks, code based attacks, or physical extraction. In certain embodiments, a physically unclonable function (PUF) or similar hardware block may be used to encrypt the secret key. That secret key is then stored in a part of the embedded device so that it cannot be accessed or tampered with.

SecureIdentity: The ability of the embedded device to provide a certificate chain proving that a specific device with a specific UID and private key was manufactured by the device manufacturer (DM). In addition, the embedded device must be able to use the private key associated with the SecureIdentity to prove that it is that embedded device through a public key base challenge mechanism.

Secure Enclave: A portion of the embedded device providing security services wherein the behavior cannot be manipulated or altered by the OEM (or an external attacker). The device manufacturer provides all code running in the Secure Enclave. In this disclosure, Secure Element is synonymous for Secure Enclave.

Figure 6:
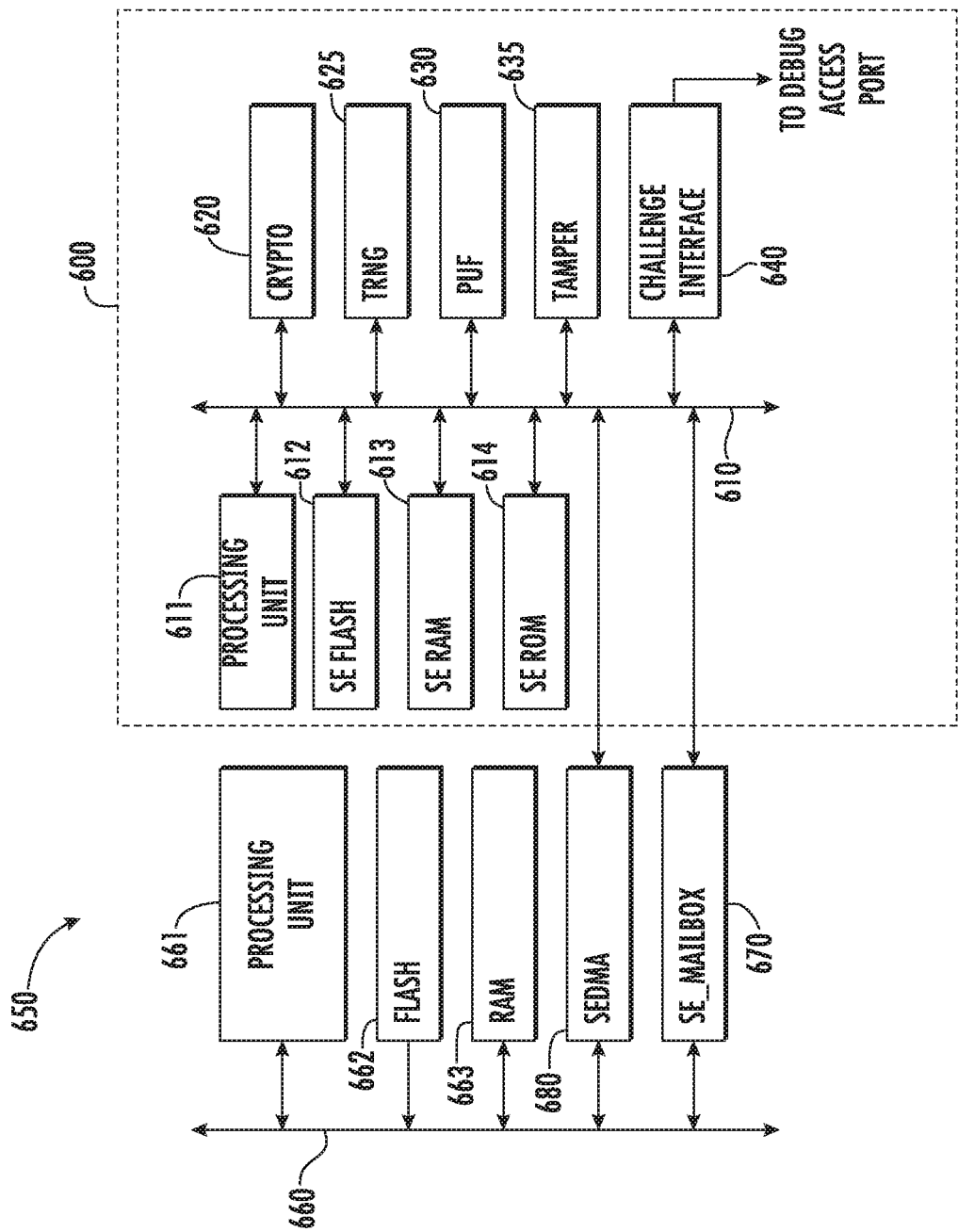
FIG. 6 shows a block diagram of a representative embedded device with a Secure Enclave.

FIG. 6 shows a representative block diagram of a Secure Enclave that may be used with the present disclosure. The Secure Enclave 600 is disposed within an embedded device 650. The portion of the embedded device 650 that is not part of the Secure Enclave 600 may be referred to as the OEM portion of the embedded device 650. The OEM portion of the embedded device 650 has a system bus 660. The system bus 660 connects the main processing unit 661, FLASH memory 662, and memory 663. The FLASH memory 662 may include the instructions executed by the main processing unit 661. Other hardware blocks, such as a radio, a UART, a SPI interface, analog to digital converters (ADCs) and digital to analog converters (DACs) are not shown but may be included. The Secure Enclave 600 comprises a Secure Enclave System Bus 610. The Secure Enclave System Bus 610 connects the processing unit 611 and its memory. The memory may comprise a FLASH memory 612, a random access memory (RAM) 613 and a read only memory (ROM) 614. In some embodiments, accelerators are also disposed within the Secure Enclave 600. These accelerators may include a cryptographic unit 620, a true random number generator (TRNG) 625, a physical unclonable function (PUF) 630, a tamper-detection circuit 635 and a challenge interface 640. Note that the only connections between the Secure Enclave 600 and the OEM Portion of the embedded device are the Secure Enclave MAILBOX 670 and the Secure Enclave DMA 680. The Secure Enclave MAILBOX 670 is a hardware communication block that allows the OEM portion of the embedded device 650 to request operations from the Secure Enclave 600. The Secure Enclave 600 may utilize the Secure Enclave DMA 680 to retrieve or write data to and from the OEM portion of the embedded device 650.

The manufacturing process described herein allows the OEM to ensure that the contract manufacturer programs the embedded device (provided by the device manufacturer) as instructed and ensures that any confidential OEM data is not visible to the contract manufacturer. These benefits do not rely in any way on the security of the contract manufacturer's test system or premises. Further, it is assumed that the contract manufacturer and its personnel cannot be trusted.

This disclosure is concerned with two concepts; integrity and confidentiality. Integrity is the concept that the firmware has not been altered in any way. Confidentiality is the concept that the firmware has remained secret.

FIGS. 2-5 show the structure of the memory 50 of the embedded device and the interaction with the secure host 10. It is understood that the secure host 10 is not directly attached to the embedded device; rather the figures are intended to show the interactions between these two elements. In fact, it is the tester 20 that actually interacts with the embedded device in the product 40.

In these figures, solid lines are used to denote direct access to a memory, such that programming of data may be achieved by the tester 20. The dashed lines show requests, commands or responses that are made between the secure host 10 and the Secure Enclave.

The memory 50 is partitioned into a first part, disposed in the Secure Enclave 600, and a second part, disposed outside the Secure Enclave 600. The memory 50 includes a first portion 51 of secure code, a second portion 52 that is one-time-programmable, and a third portion 53 that is non-volatile and rewritable. The first portion 51 may be hard-coded or provided by the device manufacturer at the time of device manufacture. Referring to FIG. 6, the first portion 51 may reside in the Secure Enclave 600, and may be the FLASH memory 612, the memory 613 or the ROM 614. Further, this memory may be configured so as not to be visible to an external component. This first portion 51 is within the Secure Enclave 600 and is in the first part of the memory 50. The second portion 52 may be a one time programmable (OTP) memory. This second portion 52 may refer to a portion of the FLASH memory 612 in the Secure Enclave 600 that is never erased, effectively limiting it to one time programming. In other embodiments, the second portion 52 may be actual OTP memory. In other embodiments, this second portion 52 may be disposed outside the Secure Enclave 600. Thus, this second portion 52 of the memory may be in the first part or in the second part of the memory 50. This second portion 52 is accessible to applications executing outside the Secure Enclave 600. The third portion 53 may be a FLASH memory or any other non-volatile, rewritable memory technology. The third portion 53 may refer to the FLASH memory 662 in the OEM portion of the embedded device 650. The third portion 53 of the memory is in the second part of the memory, disposed outside the Secure Enclave 600.

At the time of device manufacture, the embedded device 650 creates a key in the memory 50 of the embedded device. This is a private key, referred to as the SE_CHIP_ID_KEYPRIV key 61. This SE_CHIP_ID_KEYPRIV key 61 is disposed in the first portion 51 of the memory 50. The public key may be obtained by querying the device, and specifically, by querying the Secure Enclave 600. Further, the public key is generated by the device when the private key is generated. In addition, the device manufacturer may record the value of the public key in the manufacturing test data in case it is needed at a later time. As the name suggests, the public key (and the certificate containing it) is public knowledge.

As stated above, the embedded device comprises a Secure Enclave 600, as shown in FIG. 6. This is a portion of the embedded device 650 that cannot be modified by any external components. The Secure Enclave 600 may comprise a processing unit 611 and memory that contains the instructions that are executed by the processing unit 611 in the Secure Enclave 600. The memory associated with the Secure Enclave 600 is disposed in the first portion 51 of the memory 50. The instructions executed by the processing unit 611 in the Secure Enclave 600 are referred to as Root Code 54 in FIGS. 2-5. The Secure Enclave 600 has the ability to read and write other portions of the memory, such as the second portion 52 and the third portion 53, such as through the use of the Secure Enclave DMA 680, the Secure Enclave MAILBOX 670 or other methods. Further, the Secure Enclave 600 has the ability to communicate with external components such as via a hardware interface, such as by using the Challenge Interface 640. The Secure Enclave 600 may also have the ability to perform the Secure Boot and the SecureIdentity as described above.

Subsequentially, the SecureIdentity of the Secure Enclave 600 may also load several certificates within the second portion 52 of the memory 50. A certificate is a key and some data about that key which is signed by another entity so it can be verified. As described above, the Secure Enclave 600 may use the Secure Enclave DMA 680 or the Secure Enclave MAILBOX 670 to provide this function.

A first key is referred to as the SE_CHIP_ID_KEYPUB key and is contained within the SE_CHIP_ID_CERTPUB certificate 62. The second key is referred to as the BATCH_#_BATCH_KEYPUB key and is contained within the BATCH_#_BATCH_CERTPUB certificate 63. More specifically, SE_CHIP_ID_CERTPUB certificate 62 contains the SE_CHIP_ID_KEYPUB key and some additional data and is signed using the BATCH_#_BATCH KEYPRIV whose public key is provided in the BATCH_#_BATCH_CERTPUB certificate 63. The BATCH_#_BATCH_CERTPUB certificate 63 contains the BATCH_#_BATCH_KEYPUB key and some additional data and is signed by a different private key. In certain embodiments, the BATCH_#_BATCH_CERTPUB's signature is validated by a public key that may be obtained from the device manufacturer. Thus, the certificate chain comprises both the SE_CHIP_ID_CERTPUB certificate 62 and the BATCH_#_BATCH_CERTPUB certificate 63.

The SE_CHIP_ID_KEYPRIV key and the SE_CHIP_ID_KEYPUB key are created by the Secure Enclave 600 at the time of manufacture. The DM reads the SE_CHIP_ID_KEYPUB key from the Secure Enclave, and creates the SE_CHIP_ID_CERTPUB certificate 62. The BATCH_#_BATCH_KEYPUB key is created by the DM, and provided to the Secure Enclave 600. The BATCH_#_BATCH_CERTPUB certificate 63 is also created by the DM. The Secure Enclave 600 loads these certificates into the second portion 52.

Additionally, the embedded device 650 has a debug interface that allows an external component, such as the tester 20, to write directly to the second portion 52 and the third portion 53.

Figure 2:
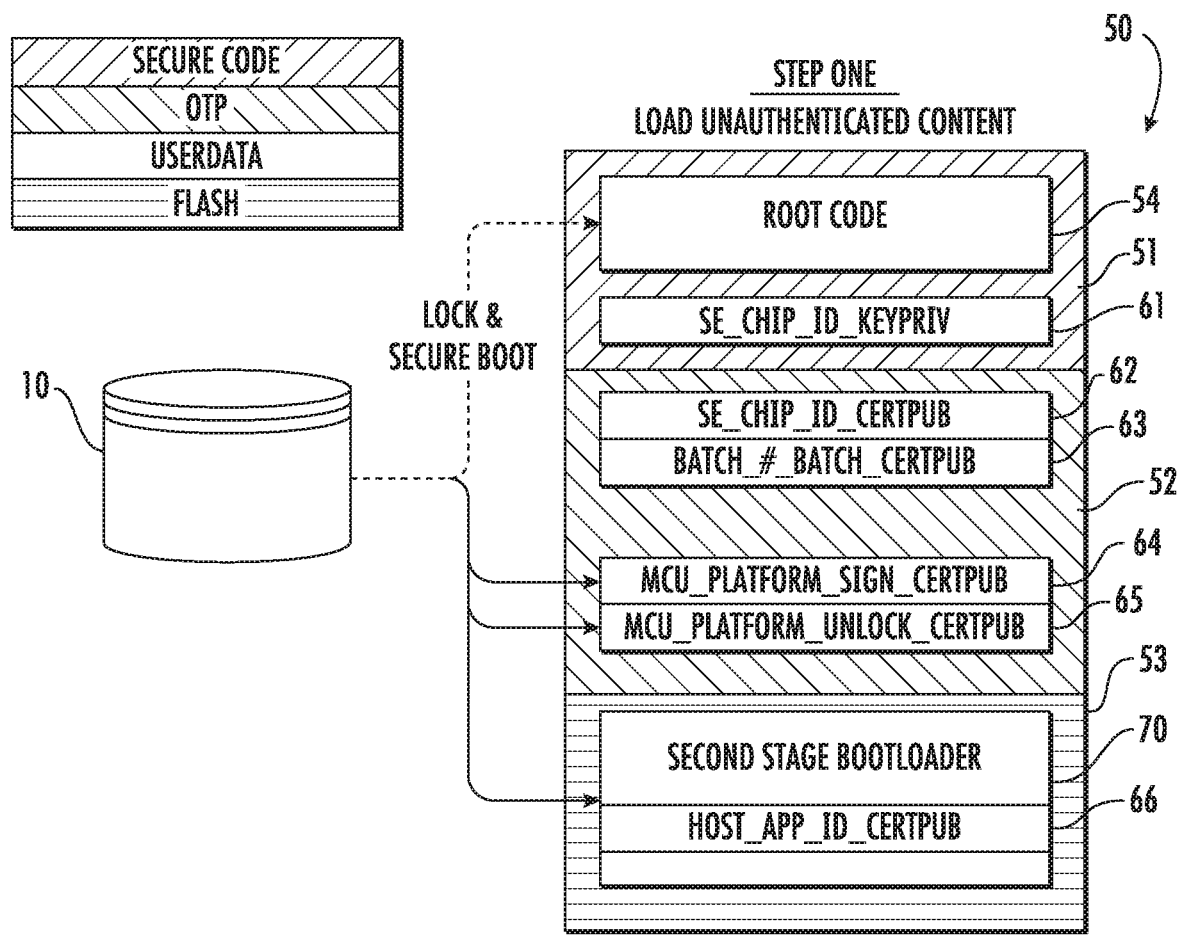
FIG. 2 shows the first phase of a secure process for programming an embedded device according to one embodiment.

FIG. 2 shows the first phase of a secure process for programming an embedded device that includes the features noted above. In this phase of the process, unauthenticated content is loaded.

In this first phase, the tester 20 programs two public keys, establishing the credentials for secure boot and debug unlock. This may be done using a debug interface or via another method such as a manufacturer installed bootloader. In essence, the tester 20 is informing the unprogrammed embedded device which entities to trust. In other words, only the entity with the associated private keys, which is the secure host 10, is to be trusted. In certain embodiments, the OEM may also copy the private keys to other devices in addition to the secure host 10. This would allow these other devices to have the ability to unlock the debug interface and program the bootloader, if desired. The tester 20 programs a set of public keys associated with the platform. The first public key is referred to as the MCU_PLATFORM_SIGN_KEYPUB key, which is contained within the MCU_PLATFORM_SIGN_CERTPUB certificate 64 and the second public key is referred to as the MCU_PLATFORM_UNLOCK_KEYPUB key which is contained within the MCU_PLATFORM_UNLOCK_CERTPUB certificate 65. The first public key, the MCU_PLATFORM_SIGN_KEYPUB key, is the key that is used to sign and authenticate code provided by the OEM and written in the embedded device. The Secure Enclave 600 uses this certificate to validate the code that the OEM has programmed into the third portion 53. The MCU_PLATFORM_UNLOCK_CERTPUB certificate 65 is used to establish what entities are authorized to unlock the debug port. In certain embodiments, the MCU_PLATFORM_UNLOCK_CERTPUB certificate 65 is not used and may not be written into the second portion 52.

In this phase, the tester 20 also programs a bootloader 70 in the third portion 53. The secure host 10 loads this bootloader 70 and signs it with the MCU_PLATFORM_SIGN_KEYPRIV private key. The bootloader 70 is used to write the desired code into the third portion 53 of the memory 50. The bootloader 70 may include various functions, such as checking the checksum for integrity, decrypting the incoming instructions using a key, deleting data in the FLASH memory, and other functions. The bootloader 70 comprises instructions that are executed by the main processing unit 661. The bootloader 70 includes a third public key that can be used to verify the identity of the secure host 10. This third public key is referred to as the HOST_APP_ID_KEYPUB key and is contained within the HOST_APP_ID_CERTPUB certificate 66. In this way, the bootloader can trust data from the secure host 10. In certain embodiments, the HOST_APP_ID_KEYPUB key may be the same as the MCU_PLATFORM_SIGN_KEYPUB key or the MCU_PLATFORM_UNLOCK_KEYPUB key.

Finally, the tester 20 locks the debug interface. This may be achieved by having the tester 20 make a request to the Secure Enclave 600. The Secure Enclave 600 then takes the appropriate actions, which may include programming some data in first portion 51 or second portion 52. This same request may also enable Secure Boot. This prevents the tester 20 from accessing the memory 50 of the embedded device directly. Enabling secure boot ensures that only trusted code is executed.

Specifically, when Secure Boot is enabled, the Secure Enclave 600 will, as part of the boot process, validate that the content of bootloader 70, and any other code written in third portion 53, is correctly signed with MCU_PLATFORM_SIGN_KEYPRIV key. This is the definition of Secure Boot.

The Secure Enclave 600 achieves this function by using the MCU_PLATFORM_SIGN_KEYPUB public key contained within the MCU_PLATFORM_SIGN_CERTPUB certificate 64 which has been programmed into second portion 52.

There are several breaches that can occur during this first phase of the secure process. For example, an attacker may alter the certificates, alter the bootloader, or fail to engage the lock/secure boot mechanism. These faults are detected at a later time. No confidential information is provided in this step, so confidentiality is not at risk.

Figure 3:
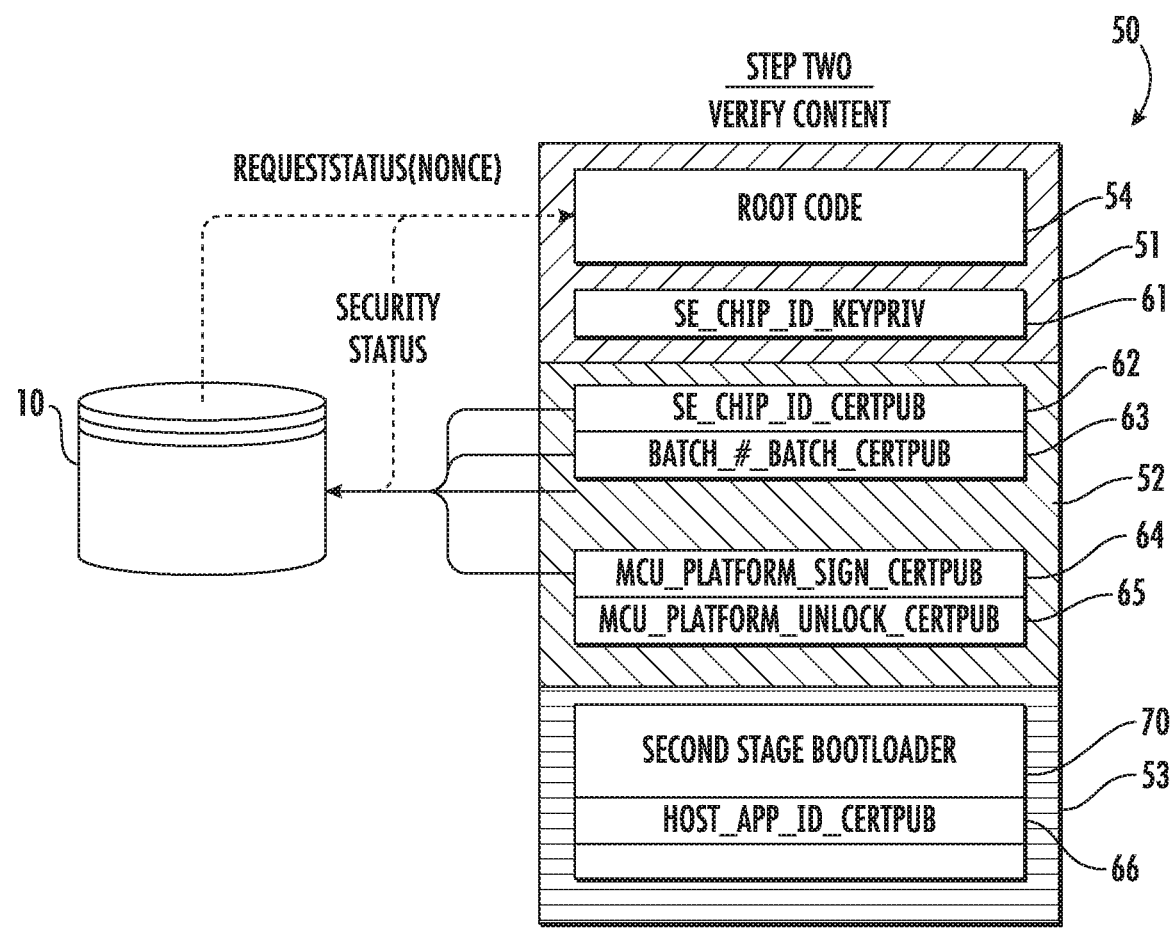
FIG. 3 shows the second phase of a secure process for programming an embedded device according to one embodiment.

FIG. 3 shows the second phase of a secure process for programming an embedded device. In this phase of the process, the content loaded in the first phase is verified.

In this phase, the Secure Enclave 600 confirms that the embedded device is locked, Secure Boot is enabled, and that the expected MCU_PLATFORM_SIGN_CERTPUB certificate 64 and the MCU_PLATFORM_UNLOCK_CERTPUB certificate 65 are programmed. The behavior of the Secure Enclave itself is protected by Secure Boot.

Also in the second phase of the process, the secure host 10 communicates directly with the Secure Enclave 600, such as via a hardware interface or through the programmed bootloader 70, to verify that the first phase of the process was carried out as intended. In this part, the SecureIdentity of the Secure Enclave 600 is used to prevent an attacker from pretending to be the Secure Enclave 600 or altering the response of the Secure Enclave 600. Specifically, the secure host 10 must use a public key challenge to access the Secure Enclave 600. As shown in FIG. 3, the secure host 10 issues a request for status to the Secure Enclave 600. The Secure Enclave 600 provides a security status back to the secure host 10. The secure host 10 has access to the SE_CHIP_ID_CERTPUB certificate 62 which contains the SE_CHIP_ID_KEYPUB key. That public key is used to verify that the response is correctly signed by the Secure Enclave 600. The SE_CHIP_ID_KEYPUB and SE_CHIP_ID_KEYPRIV keypair is unique for each device so the secure host 10 knows exactly which Secure Enclave 600 signed the response.

Specifically, the secure host 10 queries the embedded device (via the Secure Enclave 600) for its certificate chain. The Secure Enclave 600 provides the secure host 10 with the SE_CHIP_ID_CERTPUB certificate 62 and the BATCH_#_BATCH_CERTPUB certificate 63.

The SE_CHIP_ID_CERTPUB certificate 62 informs the secure host 10 that "this is device X; use private key Y to authenticate messages from this device". Next, the secure host 10 needs to confirm that the SE_CHIP_ID_CERTPUB certificate 62 has not been tampered with. To do this, the secure host 10 checks the signature of the certificate using the public key in BATCH_#_BATCH_CERTPUB certificate 63 to know that it has not been altered. To confirm that the BATCH_#_BATCH_CERTPUB certificate 63 has not been tampered with, the secure host 10 may access a database to retrieve another certificate, referred to as the root_cert certificate. The secure host 10 may then use the public key in that root_cert certificate to validate the BATCH_#_BATCH_CERTPUB certificate 63. The root_cert certificate may be held by the device manufacturer. Thus, the secure host 10 may access a database or website from the device manufacturer to obtain the root_cert certificate.

In addition, this initial request for status issued by the secure host 10 contains a random number, randA, generated by the secure host 10. That random number, randA, is included in the response from the Secure Enclave 600, allowing the secure host 10 to validate not only that the response is from the expected Secure Enclave 600 but also that this response is the response to this particular request and not a replay of some previous response to another request.

Additionally, as stated above, the SE_CHIP_ID_CERTPUB certificate 62, the BATCH_#_BATCH_CERTPUB certificate 63, the MCU_PLATFORM_SIGN_CERTPUB certificate 64 and the MCU_PLATFORM_UNLOCK_CERTPUB certificate 65 may be returned to the secure host 10. These certificates may be returned in the same manner that the security status is delivered. Specifically, a request is made from the secure host 10 with a new random number. The Secure Enclave 600 provides the data, includes the new random number and signs the response so that it can be trusted by the secure host 10.

There are a number of methods for creating this secure connection. These methods may depend on hardware implementation, however the disclosure is not limited to any particular embodiment. Any process for establishing a secure connection using public key exchange can be used.

The possible breaches of security in the first phase are detected in this second phase. For example, if an attacker failed to enable secure boot/debug lock, or altered the MCU_PLATFORM_SIGN_CERTPUB certificate 64 and/or the MCU_PLATFORM_UNLOCK_CERTPUB certificate 65, the secure host 10 will receive this information from the Secure Enclave 600. Thus, the secure host 10 will know that the embedded device has not been configured correctly. Alternatively, if the attacker edits the bootloader 70, the secure boot will fail and the embedded device will not function. In all these cases, the secure host 10 determines that the embedded device was not manufactured properly. In response, the embedded device may be scrapped to prevent exploit.

Figure 4:
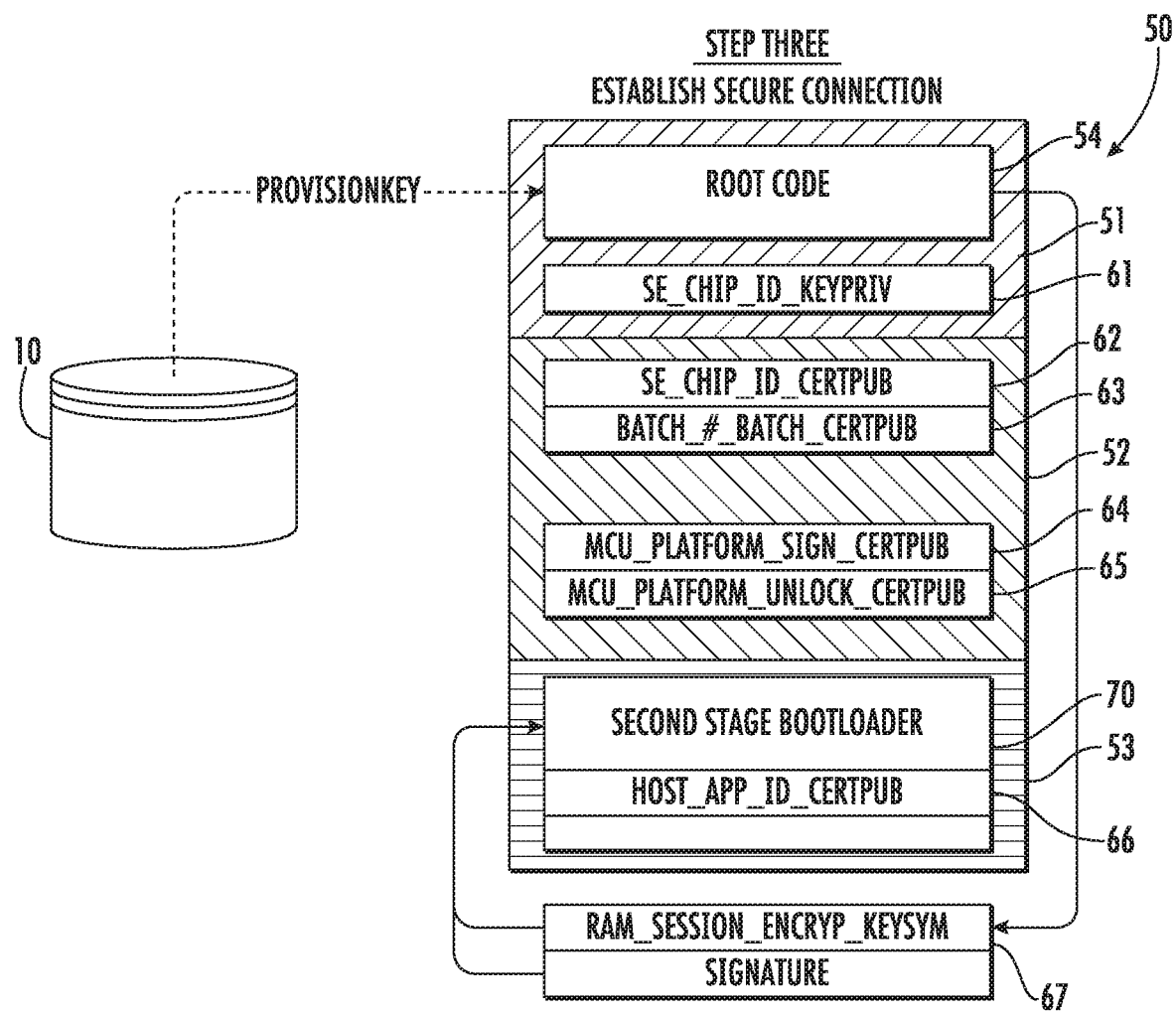
FIG. 4 shows the third phase of a secure process for programming an embedded device according to one embodiment.

FIG. 4 shows the third phase of a secure process for programming an embedded device. In this phase of the process, a secure connection is established between the secure host 10 and the Secure Enclave 600.

In the third phase, the secure host 10 provides a session key 67, such as a symmetric AES key or another type of key, for the bootloader 70 via the Secure Enclave 600. Again, the secure host 10 communicates with the Secure Enclave 600 using a hardware interface or through the programmed bootloader 70. The session key 67, referred to as RAM_SESSION_ENCRYP_KEYSYM, is signed with the HOST_APP_ID_KEYPRIV key, which is the private key associated with the HOST_ID_APP_CERTPUB certificate 66, and encrypted with SE_CHIP_ID_KEYPUB key. The Secure Enclave 600 will decrypt the session key 67 using the SE_CHIP_ID_KEYPRIV key 61 and provide the decrypted key to the bootloader 70 which can then authenticate it using the HOST_APP_ID_CERTPUB certificate. An attacker will not be able to obtain the value of the session key 67 in transit since it is encrypted. Further, once decrypted, the session key 67 never leaves the embedded device and cannot be accessed by any external entity. This session key 67 is typically stored in the third portion 53 or may be stored in the memory 663. Thus, the third phase provides a session key that will be used to encrypt all communication between the secure host 10 and the bootloader 70.

Figure 5:
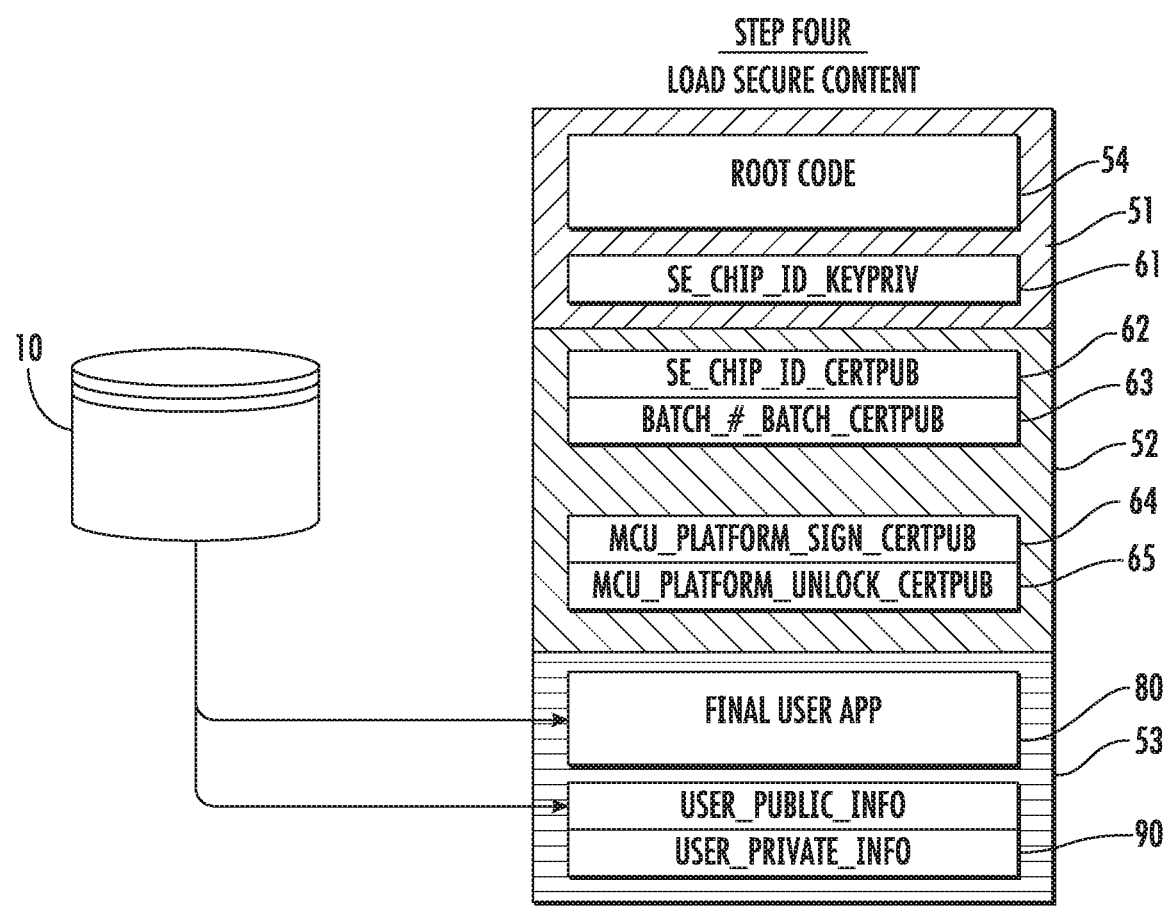
FIG. 5 shows the fourth phase of a secure process for programming an embedded device according to one embodiment.

FIG. 5 shows the fourth phase of a secure process for programming an embedded device. In this phase of the process, secure content is loaded from the secure host 10 to the bootloader 70. Note that in FIG. 5, the bootloader 70 is not shown. In certain embodiments, the bootloader 70 may be overwritten or erased during the fourth phase of the secure process. In other embodiments, a bootloader 70 may remain in the third portion 53. This may allow new software to be loaded into the device at a later time without the need to reload the bootloader 70, as was loaded in the first step shown in FIG. 2.

In the fourth phase, the session key 67 provided in the previous phase can be used to encrypt traffic between the secure host 10 and bootloader 70. The secure host 10 can now send a confidential software application 80 and any required confidential data 90 via the bootloader 70. The communication between the tester 20 and the bootloader 70 may occur via any interface on the product 40, including a UART, a SPI interface, an I2C interface, a USB interface, or another mode. Secure boot protects the integrity of any data sent in this way and the session key 67 protects its integrity.

Thus, the secure host 10 must have the SE_CHIP_ID_KEYPUB key and the HOST_APP_ID_KEYPRIV key in order to successfully transfer information to the bootloader 70. Any attacker that lacks either of these keys is unable to access or reprogram the memory 50 in the embedded device. Further, any attacker would need to possess the HOST_APP_ID_KEYPRIV key to look at the data being programmed.

Other embodiments are also possible. For example, in another embodiment, only the third and fourth phases of the process are performed. Specifically, the secure host 10 establishes a connection to the Secure Enclave 600 using a hardware connection, such as that described above. However, in this case, a bootloader is not installed. Rather, a secure tunnel is established between the Secure Enclave 600 and the secure host 10 using the SE_CHIP_ID_KEYPUB key. Once this is done, the third and fourth phases described above are executed. However, in this embodiment, the functions that are performed by the Secure Enclave 600 may be much more extensive. For example, the Secure Enclave 600 may include the bootloader 70 described above.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of loading firmware from a secure host into an embedded device while maintaining the integrity and confidentiality of the firmware, wherein the embedded device comprises a memory and a Secure Enclave having a processing unit, wherein a first part of the memory is disposed in the Secure Enclave, a second part of the memory is disposed outside the Secure Enclave, the method comprising:

downloading unauthenticated content from the secure host into the second part of the memory;

using the Secure Enclave to verify the unauthenticated content was loaded by a trusted entity;

transmitting a shared key from the secure host to the Secure Enclave, wherein the shared key is encrypted; and loading the firmware from the secure host to the second part of the embedded device, wherein the firmware is encrypted using the shared key.

2. The method of claim 1, wherein the unauthenticated content comprises a bootloader.

3. The method of claim 2, wherein when loading the firmware, the secure host communicates directly with the bootloader.

4. The method of claim 2, wherein the unauthenticated content further comprises a first public key certificate and the Secure Enclave uses the first public key certificate to verify the bootloader.

5. The method of claim 4, wherein the secure host loads a second public key certificate with the bootloader, and wherein the bootloader uses the second public key certificate to verify the firmware from the secure host.

6. The method of claim 1, wherein the Secure Enclave prevents access to the second part by the secure host after the unauthenticated content has been verified.

7. The method of claim 1, wherein a first public key certificate and a second public key certificate are loaded into the memory, and the secure host verifies that an identity of the embedded device based on the first public key certificate and the second public key certificate.

8. The method of claim 7, wherein the shared key is encrypted using a public key contained in the first public key certificate.

9. A method of loading firmware from a secure host into an embedded device while maintaining the integrity and confidentiality of the firmware, wherein the embedded device comprises a memory and a Secure Enclave having a processing unit, wherein a first part of the memory is disposed in the Secure Enclave, a second part of the memory is disposed outside the Secure Enclave, the method comprising:

downloading a first public key certificate, referred to as MCU_PLATFORM_SIGN_CERTPUB certificate, from the secure host into the memory;

downloading a bootloader from the secure host into the second part of the memory, wherein the bootloader is signed using a private key associated with the MCU_PLATFORM_SIGN_CERTPUB certificate;

downloading a second public key certificate, referred to as HOST_APP_ID_CERTPUB certificate, from the secure host to the second part of the memory;

using the Secure Enclave to verify the bootloader was loaded by a trusted entity using the MCU_PLATFORM_SIGN_CERTPUB certificate;

transmitting a shared key from the secure host to the Secure Enclave, wherein the shared key is encrypted using a public key contained within a third public key certificate, referred to as SE_CHIP_ID_CERTPUB certificate, stored in the memory, and signed using a private key associated with the HOST_APP_ID_CERTPUB certificate; and loading the firmware from the secure host to the bootloader, wherein the firmware is encrypted using the shared key.

10. The method of claim 9, wherein the Secure Enclave prevents access to the second part by the secure host after the bootloader has been verified.

11. The method of claim 10, wherein the secure host loads a fourth public certificate, referred to as MCU_PLATFORM_UNLOCK_CERTPUB, wherein the secure host may later unlock the second part using a private key associated with the MCU_PLATFORM_UNLOCK_CERTPUB certificate.

12. The method of claim 9, wherein a fourth public key certificate, referred to as SE_CHIP_ID_CERTPUB certificate, and a fifth public key certificate, referred to as BATCH_#_BATCH_CERTPUB certificate, are loaded into the memory, and the secure host verifies that an identity of the embedded device based on the SE_CHIP_ID_CERTPUB certificate and the BATCH_#_BATCH_CERTPUB certificate.

13. The method of claim 12, wherein the SE_CHIP_ID_CERTPUB certificate is signed using a private key associated with the BATCH_#_BATCH_CERTPUB certificate.

14. The method of claim 13, wherein the BATCH_#_BATCH_CERTPUB certificate is signed using a private key, wherein a public key is available from a manufacturer of the embedded device.

15. A method of loading firmware from a secure host into an embedded device while maintaining the integrity and confidentiality of the firmware, wherein the embedded device comprises a memory and a Secure Enclave having a processing unit, wherein a first part of the memory is disposed in the Secure Enclave, a second part of the memory is disposed outside the Secure Enclave, the method comprising:

transmitting a shared key from the secure host to the Secure Enclave, wherein the shared key is encrypted using a public key contained within a first public key certificate, referred to as SE_CHIP_ID_CERTPUB certificate, stored in the memory;

transmitting the firmware from the secure host to the Secure Enclave, wherein the firmware is encrypted using the shared key; and using the Secure Enclave to load the firmware into the second part.

* * * * *